United States Patent
Long

(10) Patent No.: US 9,759,366 B2
(45) Date of Patent: Sep. 12, 2017

(54) WATER MAIN BREAK REPAIR TOOL

(71) Applicant: John N. Long, Searcy, AR (US)

(72) Inventor: John N. Long, Searcy, AR (US)

( * ) Notice: Subject to any disclaimer, the term of this patent is extended or adjusted under 35 U.S.C. 154(b) by 99 days.

(21) Appl. No.: 14/823,178

(22) Filed: Aug. 11, 2015

(65) Prior Publication Data

US 2016/0047509 A1    Feb. 18, 2016

Related U.S. Application Data

(60) Provisional application No. 62/037,017, filed on Aug. 13, 2014.

(51) Int. Cl.
*F16L 55/16* (2006.01)
*F16L 55/18* (2006.01)
*F16L 55/17* (2006.01)

(52) U.S. Cl.
CPC ............... *F16L 55/18* (2013.01); *F16L 55/17* (2013.01)

(58) Field of Classification Search
CPC ................... F16L 55/16–55/18; F16L 55/1715
USPC ...................................................... 138/99.97
See application file for complete search history.

(56) References Cited

U.S. PATENT DOCUMENTS

| | | | |
|---|---|---|---|
| 1,590,186 A | 6/1926 | Fanselow | |
| 2,151,594 A | 3/1939 | Grantham | |
| 3,502,112 A * | 3/1970 | Hankila | F16L 55/17 138/99 |
| 3,694,009 A | 9/1972 | Phillips | |
| 4,342,338 A | 8/1982 | Glennie | |
| 4,638,834 A | 1/1987 | Montgomery | |
| 5,771,938 A * | 6/1998 | McKenzie | F16L 55/17 138/97 |
| 6,675,836 B1 * | 1/2004 | Gaston | F16L 55/17 138/97 |
| 6,971,413 B2 * | 12/2005 | Taylor | F16L 1/26 138/97 |
| 2003/0141716 A1 | 7/2003 | Azar | |
| 2009/0065069 A1 | 3/2009 | Pretorius et al. | |

* cited by examiner

Primary Examiner — Patrick F Brinson
(74) Attorney, Agent, or Firm — Henry C. Query, Jr.

(57) ABSTRACT

A repair tool for use in repairing a break in a water main pipe comprises a saddle member which includes a downward facing pipe-engaging surface that is configured to conform to an outer diameter surface of the pipe, a sealing member which is attached to the pipe-engaging surface and is configured to seal between the saddle member and the pipe, a brace member which is connected to the saddle member and includes first and second end portions, first and second arm members, each of which is pivotally connected to a corresponding end portion and each of which comprises an upper end portion that extends upwardly from the brace member and a lower end portion that extends downwardly from the brace member and inwardly toward the other arm member, and a clamping arrangement connected between the upper end portions for moving the upper end portions toward and away from each other to thereby move the lower end portions away and toward each other, respectively. In use of the repair tool the saddle member is positioned over the break and the clamping arrangement is operated to move the lower end portions towards each other and into engagement with a portion of the pipe located opposite the saddle member in order to secure the saddle member to the pipe and thereby seal the break.

19 Claims, 9 Drawing Sheets

WATER MAIN BREAK REPAIR TOOL

This application claims the benefit of U.S. Provisional Patent Application No. 62/037,017 filed on Aug. 13, 2014.

BACKGROUND OF THE INVENTION

The present invention is directed to a tool for use in repairing breaks in water mains. In particular, the tool is used to seal the break and clean the area around the break before a conventional pipe repair damp is secured over the break.

When a water main breaks, for example, when a hole or stress crack forms in the pipe, the pipe must be repaired to stop the outflow of water. This usually involves excavating a hole to expose the pipe, removing mud and water from around the pipe, cleaning and sanitizing the surface of the pipe adjacent the break using a sanitizing fluid such as bleach, and then securing a pipe repair clamp over the break.

This repair work is often performed without shutting off the water main in order to prevent dirt and contaminants from entering the water supply through the break. However, when the water main is not shut off, internal pressure will force the water out of the break, creating a gush of water that makes repairing the break difficult and messy.

Currently, one way of controlling the water gush is to hold a mat over the break while the pipe repair clamp is positioned around the pipe, and then removing the mat as the repair clamp is moved over the break. However, this technique is haphazard and makes sanitizing the surface of the pipe adjacent the break difficult, as the gushing water tends to dilute the sanitizing fluid.

SUMMARY OF THE INVENTION

The present invention addresses this and other problems by providing a repair tool for use in repairing a break in a water main pipe, the repair tool comprising a saddle member which includes a downwardly facing pipe-engaging surface that is configured to conform to an outer diameter surface of the pipe; a sealing member which is attached to the pipe-engaging surface and is configured to seal between the saddle member and the pipe; a brace member which is connected to a side of the saddle member opposite the pipe-engaging surface and which includes first and second end portions; first and second arm members, each of which is pivotally connected to a corresponding end portion and each of which comprises an upper end portion that extends upwardly from the brace member and a lower end portion that extends downwardly from the brace member and inwardly toward the other arm member; and clamping means connected between the upper end portions for moving the lower end portions toward and away from each other. In use of the repair tool the saddle member is positioned over the break and the damping means is operated to move the lower end portions towards each other and into engagement with a portion of the pipe located opposite the saddle member in order to secure the saddle member to the pipe and thereby seal the break.

The saddle member may comprise a hole which extends through the pipe-engaging surface to an opening defined by the sealing member, in which event and the repair tool may further comprise a manually operated valve which is fluidly connected to the hole; and a hose which is connectable to the valve. In this manner wherein water emanating from the break is directed by the opening through the hole and into the valve and may be selectively ejected through the hose by opening and closing the valve.

Thus it may be seen that the repair tool of the present invention may be quickly and easily secured over the pipe to temporarily seal the break. In addition, the repair tool directs the water emanating from the break through the valve and the hose so that the water can be used to wash the pipe before the pipe repair clamp is deployed.

These and other objects and advantages of the present invention will be made apparent from the following detailed description, with reference to the accompanying drawings.

DETAILED DESCRIPTION OF THE INVENTION

Figure 1:
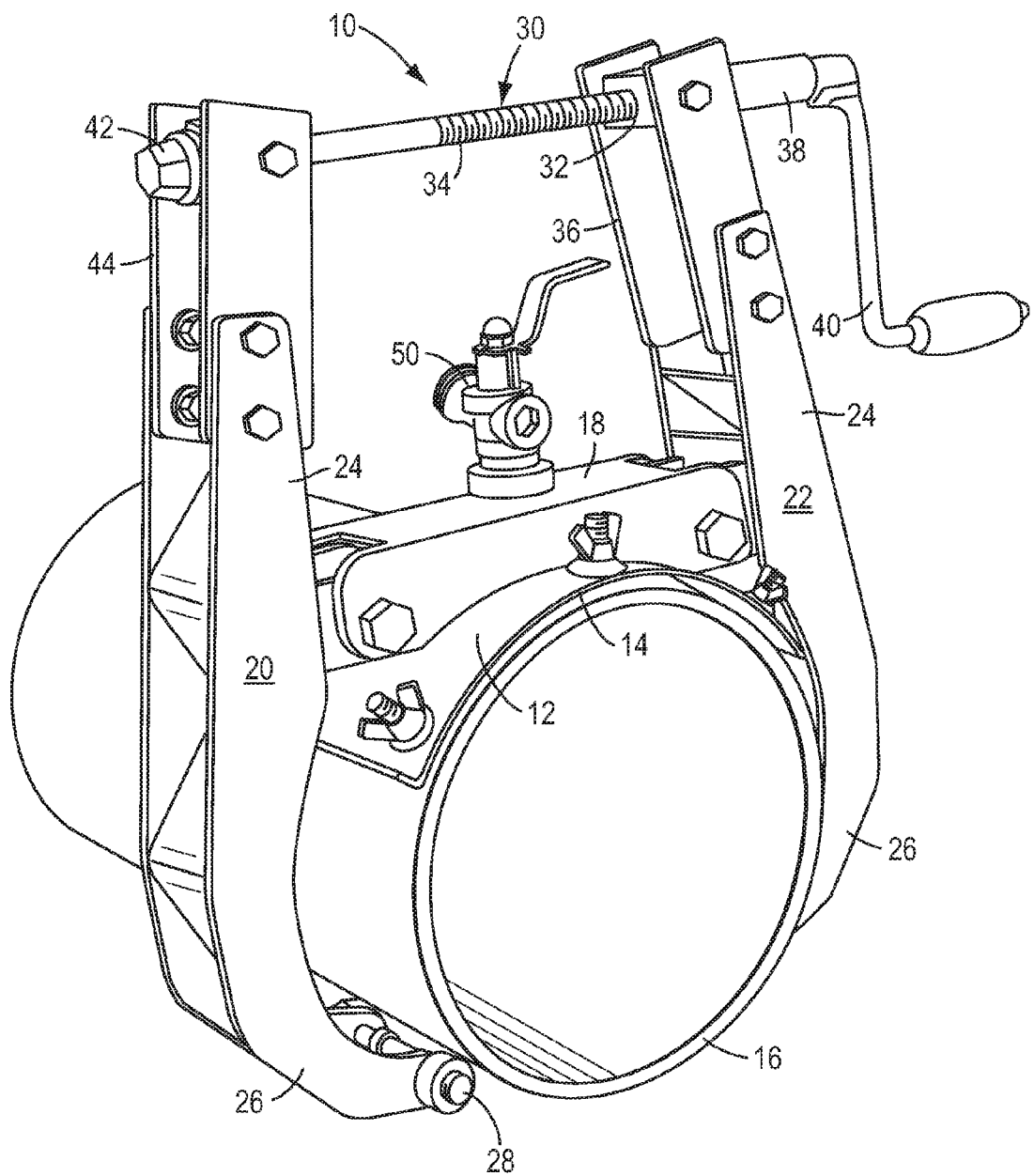
FIG. 1 is a left-front perspective view of the water main break repair tool of the present invention shown mounted on a representative 8" pipe.
Figure 2:
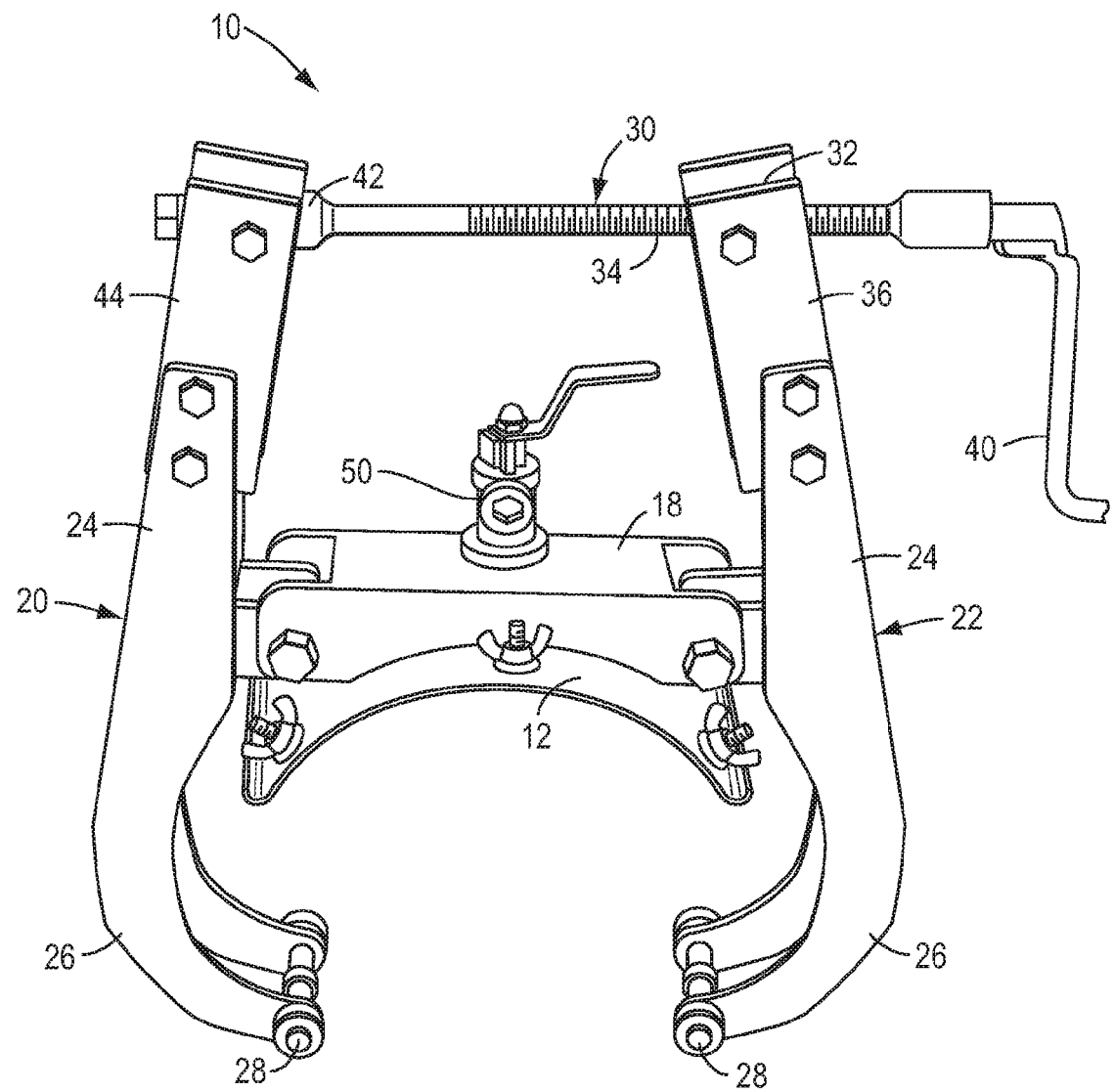
FIG. 2 is a front perspective view of the repair tool shown in FIG. 1.
Figure 3:
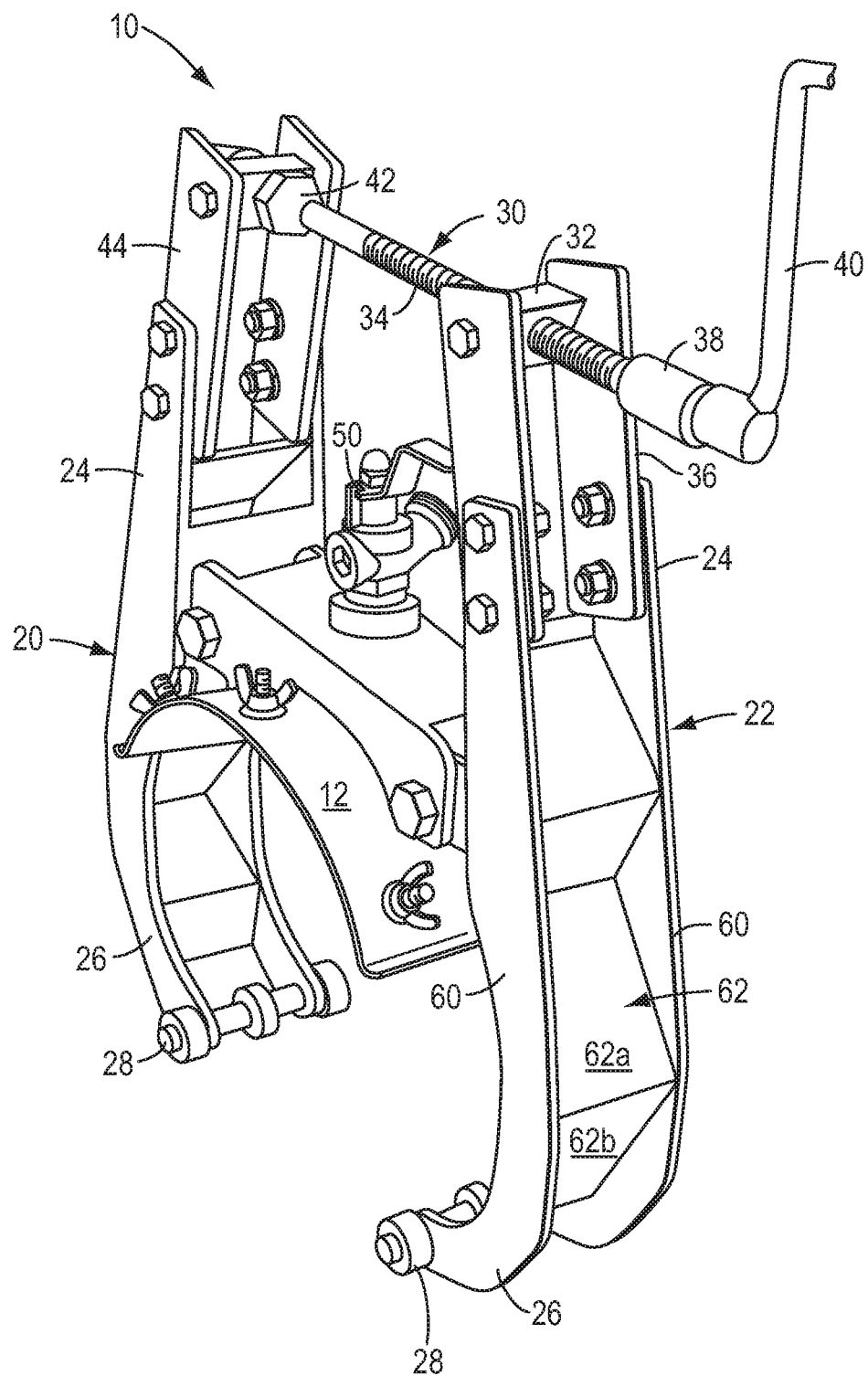
FIG. 3 is a right-front perspective view of the repair tool shown in FIG. 1.

Referring to FIGS. 1-3, the water main break repair tool of the present invention, generally 10, includes a saddle member 12 having a bottom pipe-engaging surface 14 which is designed to conform to the outer diameter surface of a water main, which is represented in FIG. 1 by a pipe 16. The saddle member 12 is connected such as by welding to a transverse brace 18, each end of which is pivotally connected to a respective arm 20, 22. Each arm has an upper end portion 24 which extends upwardly from the brace 18 and a lower end portion 26 which extends downwardly from the brace and radially inwardly around the pipe 16. A pair of rollers 28, such as cam followers, is connected to the lower end portion of each arm 20, 22. The rollers 28 help in tightening the repair tool 10 around the pipe 16, as will be described below.

A telescopic screw jack assembly 30 is connected to the upper end portions 24 of the arms 20, 22 to enable an operator to manually tighten the repair tool around the pipe 16. The screw jack assembly 30 includes a traveling nut 32 which cooperates with a threaded spindle 34. The traveling nut 32 is pivotally connected to a first bracket 36 which is bolted to the upper end portion 24 of the arm 22. The spindle 34 comprises a first end 38 to which a detachable handle 40 is connected and a second end 42 which is rotatably and pivotally connected to a second bracket 44 that in turn is bolted to the upper end portion 24 of the arm 20. In operation of the screw jack assembly 30, the handle 40 is rotated to either pull the upper end portions 24 of the arras 20, 22 together or push the upper end portions of the arms apart. When the upper end portions 24 are pulled together, the lower end portions 26 of the arms gill spread apart to enable the arms to fit over the pipe 16. Conversely, when the upper end portions 24 are pushed apart, the lower end portions 26 will move together to clamp the arms to the pipe 16. It should be noted that the first and second brackets 36, 44 may be eliminated and the screw jack assembly instead connected directly to the upper end portions 24 of the arms 20, 22.

Figure 4:
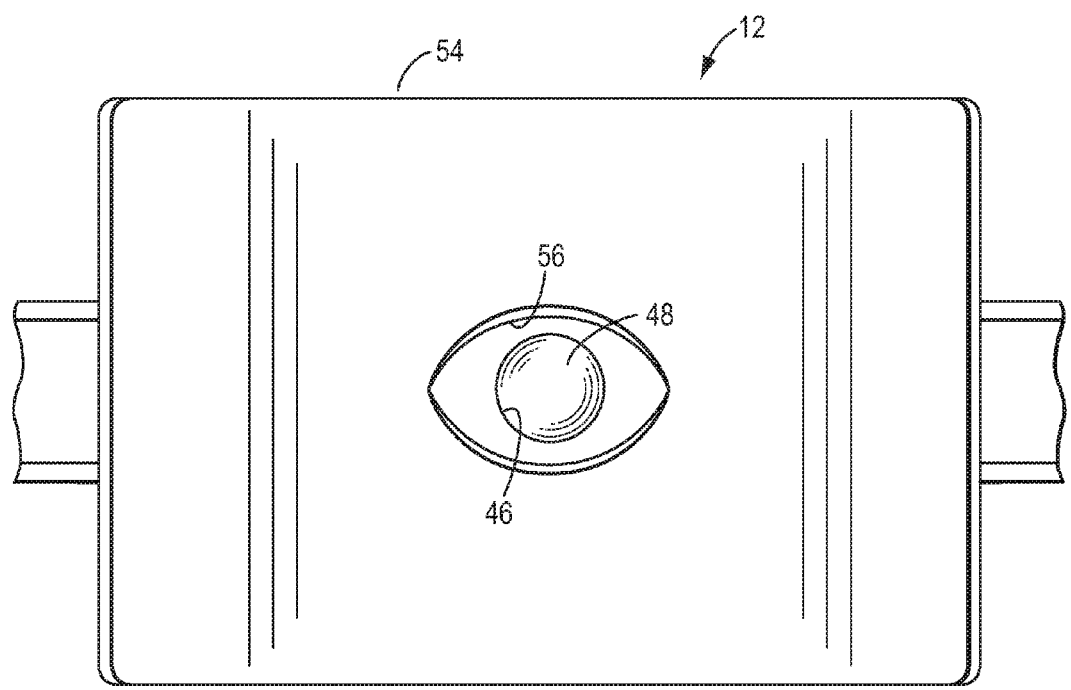
FIG. 4 is a bottom view of the saddle member component of the repair tool shown in FIG. 1.
Figure 5:
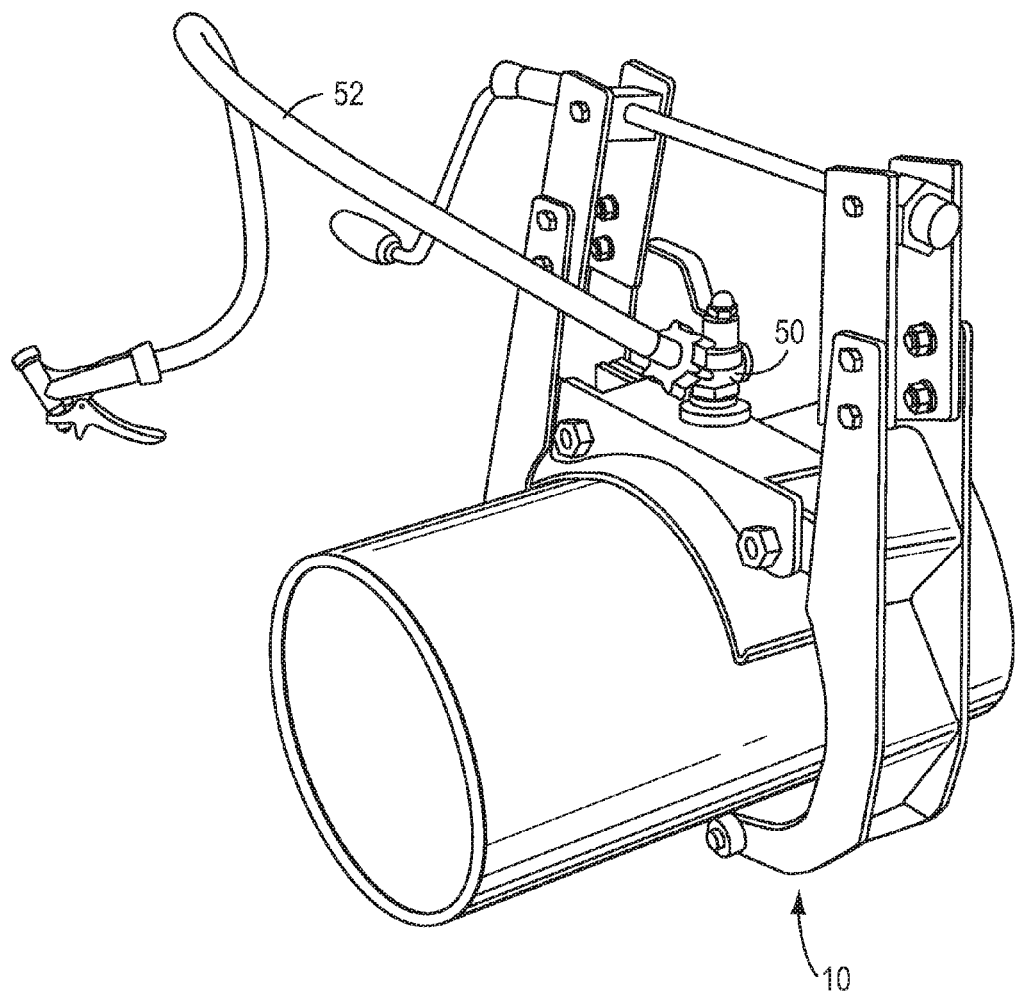
FIG. 5 is a right-rear perspective view of the repair tool shown in FIG. 1 with a hose and nozzle assembly connected to the valve component of the invention.

Referring also to FIGS. 4 and 5, the saddle member 12 comprises a central hole 46 to which a nipple 48 is welded. The nipple 48 extends upwardly through the brace 18 and is connected to a manual valve 50 to which a hose 52 may be connected. A sealing member, such as an elastomer pad 54, is affixed such as by gluing to the bottom surface 14 of the saddle member 12. The pad 54 has an enlarged opening 56 which is aligned with the hole 46 in the saddle member 12. Thus, when the saddle member 12 is secured to the pipe 16 with the opening 48 located over the break, the pad 54 will seal around the break and divert the escaping water through the nipple 48 and to the valve 50. It should be noted that the sealing member may comprise other configurations, such as a rectangular gasket which is affixed to the bottom surface 14 at the periphery of the saddle member 12.

Figure 6:
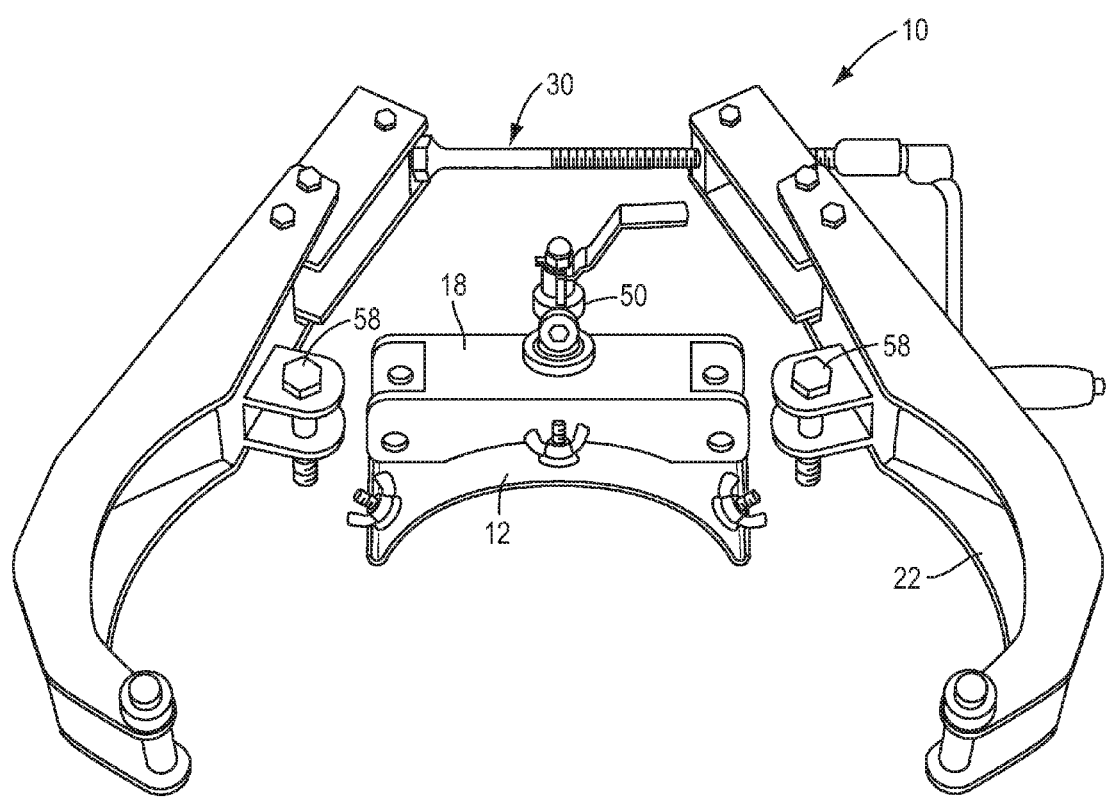
FIG. 6 is an exploded perspective view of the repair tool shown in FIG. 1.
Figure 7:
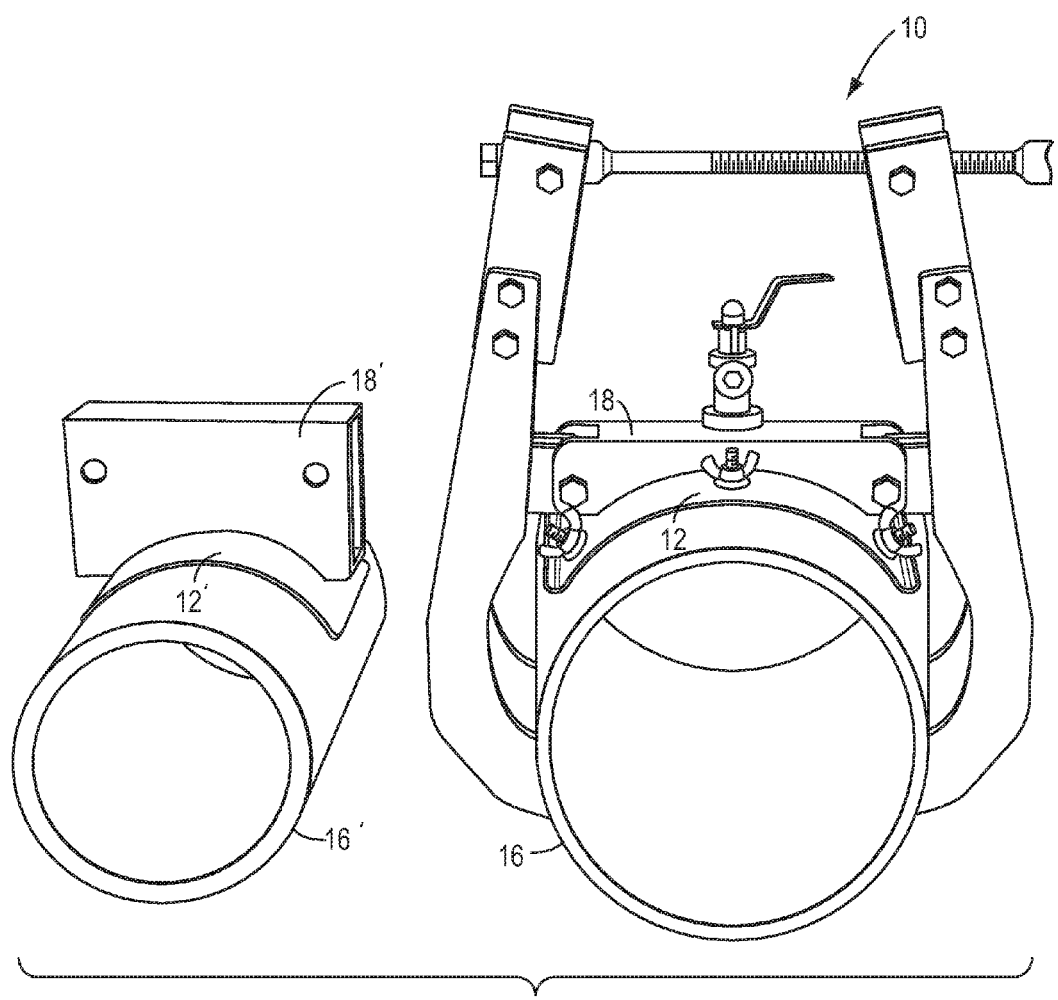
FIG. 7 is a front perspective view of the repair tool of FIG. 1 shown side-by-side with a second embodiment of the saddle member component of the invention mounted on a representative 6" pipe.

Referring also to FIG. 6, the arms 20, 22 may be pivotally connected to the brace 18 with removable pins 58, each of which may take the form of a bolt and nut assembly. This will allow the arms 20, 22 and the screw jack assembly 30 to be easily disconnected from the brace 18 and attached to a different brace, such as the brace 18' shown in FIG. 7, which is connected to a saddle member 12'. In this example, the saddle member 12' is designed for a smaller 6" water main which is represented by a pipe 16'.

In use of the repair tool 10, the handle 40 of the screw jack assembly 30 is rotated to spread apart the lower portions 26 of the arms 20, 22. The saddle member 12 is then positioned over the break and the handle 40 is rotated in the opposite direction to loosely secure the arms 20, 22 to the pipe. In this position, the water gushing from the break will be diverted downward by the saddle 12 member and the arms 20, 22. The tool 10 may then be rotated and shifted from side to side to allow the gushing water to wash away mud and debris from around the break.

Figure 8:
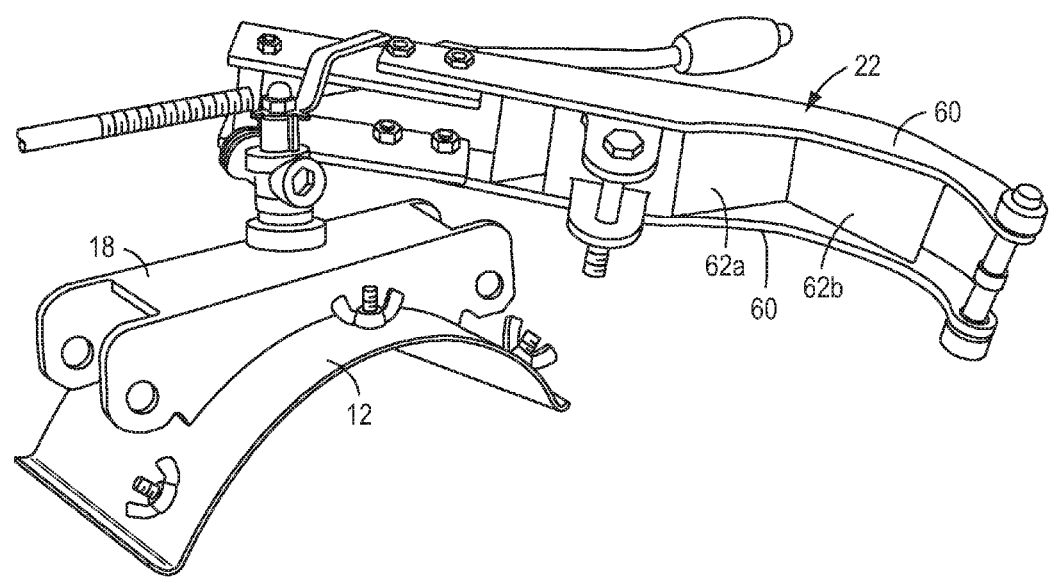
FIG. 8 is a view similar to FIG. 6 but showing only the saddle member and right arm components of the invention.

In this regard, the arms 20, 22 are specially configured to intercept and direct the gushing water downward. As shown best in FIGS. 3 and 8, each arm 20, 22 comprises two spaced apart side members 60 which are joined by a central connecting member 62. The connecting member 62 includes a top panel 62a which extends downward and outward from a location adjacent the saddle member 12 and a bottom panel 62b which extends downward and inward from the top panel. As a result, the side members 60 and the connecting member 62 together form a downwardly and inwardly directed diversion channel for the water emanating from the break. Consequently, the water will be directed to an area under the pipe instead of onto the operator of the tool 10. This feature is particularly useful when repairing shear breaks in water mains. Such breaks typically extend circumferentially around a substantial portion of the pipe. However, since the arms 20, 22 are configured to extend around a substantial portion of the circumference of the pipe as well, the water emanating from the break will be diverted by the arms 20, 22 and away from the operator.

After the mud and debris have been washed away from around the break, the handle 40 is rotated further to fully tighten the arms 20, 22 around the pipe. As the arms 20, 22 are being tightened, the rollers 28 will cam toward each other over the bottom of the pipe and thereby pull the saddle member 12 tightly against the top of the pipe. In this condition, the rubber pad 54 will effectively seal the break and divert the water into the valve 50. The hose 52 is then connected to the valve 50, the valve is opened, and the pipe is cleaned with the water emanating from the break.

Figure 9:
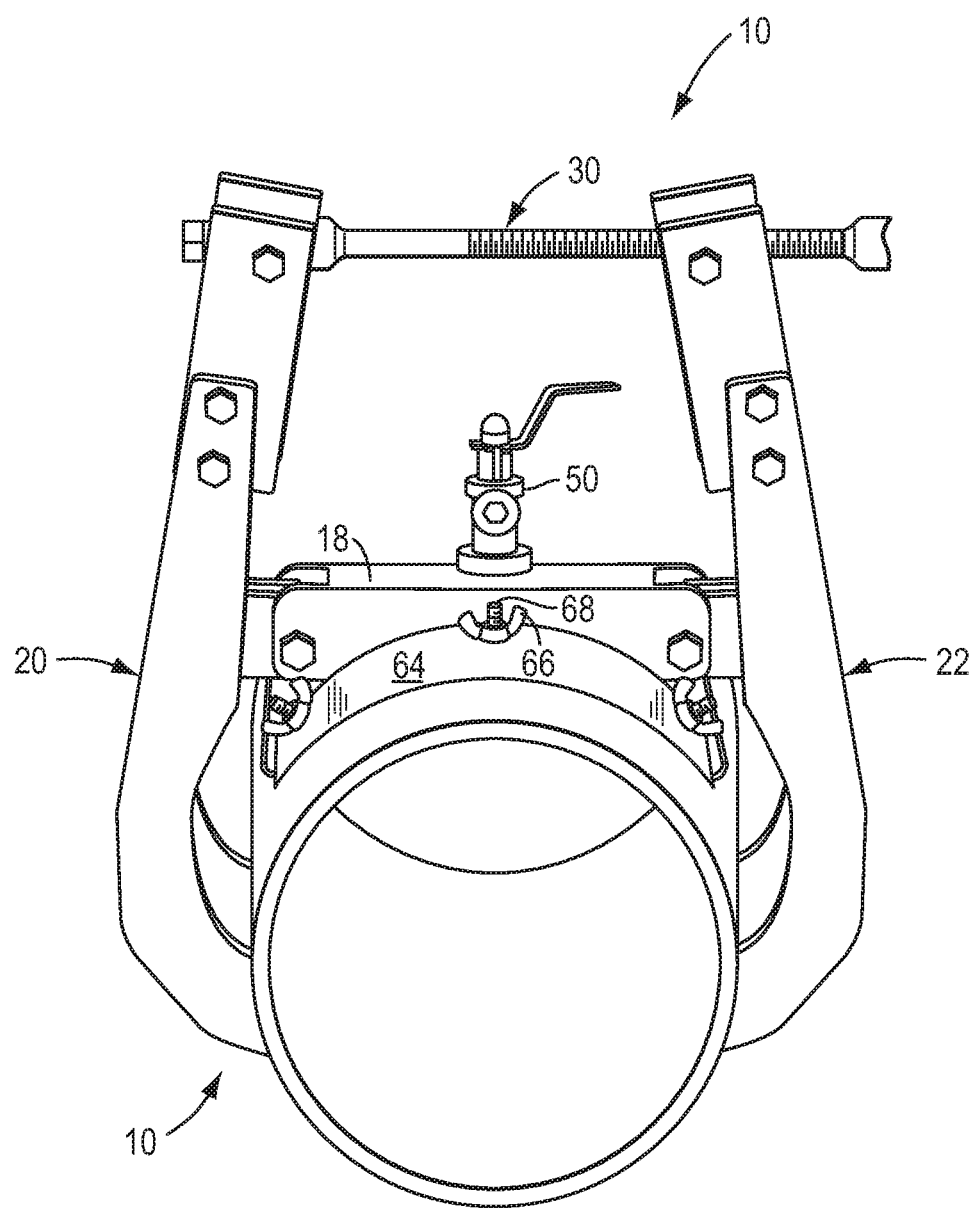
FIG. 9 is a front perspective view of the repair tool shown in FIG. 1 showing an optional skirt component of the invention connected to the repair tool.

After the pipe is thoroughly cleaned, the handle 40 is rotated to loosen the arms slightly so that the saddle member 12 may be shifted from side to side to allow the surface of the pipe around the break to be sanitized using, e.g., bleach. A conventional pipe repair clamp is then loosely secured to the pipe, butted up against the saddle member 12, and slid over the break as the saddle member is slid off of the break to prevent the gushing water from spraying the area and wetting the repair personnel. In this regard, the repair tool 10 may comprise an optional skirt member to prevent the water from spraying out from between the saddle member 12 and the pipe repair clamp as the latter is being slid into position over the break. As shown in FIG. 9, the skirt member 64 is comprised of a plate which is configured to conform generally to the outer diameter surface of the pipe 16. The skirt member 64 may be removably secured to the saddle member by a number of wing nuts 66. Each wing nut 66 bolts to respective threaded stud 68 which is connected such as by welding to the saddle member 12 and extends through a corresponding hole in the skirt member. In this manner, the skirt member 64 may be removed from the saddle member 12 when not in use.

It should be recognized that, while the present invention has been described in relation to the preferred embodiments thereof, those skilled in the art may develop a wide variation of structural and operational details without departing from the principles of the invention. Therefore, the following claims should be construed to cover all equivalents falling within the true scope and spirit of the invention.

I claim:

1. A repair tool for use in repairing a break in a water main pipe, the repair tool comprising:
   a brace member which includes first and second end portions;
   a saddle member which is connected to the brace member and which includes a downwardly facing pipe-engaging surface that is configured to conform to an outer diameter surface of the pipe;
   a sealing member which is attached to the pipe-engaging surface and is configured to seal between the saddle member and the pipe, the sealing member defining an opening which is aligned with a hole that extends through the saddle member from the pipe-engaging surface;
   a nipple which is connected to the saddle member over the hole and which extends upwardly through the brace member;
   a manually operated valve which is connected to the nipple;
   a hose which is connectable to the valve;
   first and second arm members, each of which is pivotally connected to a corresponding end portion and each of which comprises an upper end portion that extends upwardly from the brace member and a lower end portion that extends downwardly from the brace member and inwardly toward the other arm member;
   a pair of rollers, each of which is connected to a lower end of the lower end portion of a corresponding arm member;

clamping means connected between the upper end portions for moving the upper end portions toward and away from each other to thereby move the lower end portions away and toward each other, respectively;

wherein in use of the repair tool the saddle member is positioned over the break and the clamping means is operated to move the rollers towards each other and into engagement with a portion of the pipe located opposite the saddle member in order to secure the saddle member to the pipe and thereby seal the break; and wherein water emanating from the break is directed by the opening in the sealing member through the hole and the nipple and into the valve and is selectively ejected through the hose by opening and closing the valve.

2. The repair tool of claim 1, wherein the clamping means comprises a manually-operated telescopic screw jack assembly.

3. The repair tool of claim 2, wherein the screw jack assembly includes a travelling nut which is pivotally connected to the upper end portion of the first arm member and a spindle which is operatively engaged by the travelling nut and includes a first end to which a handle is connected and a second end which is rotatably and pivotally connected to the upper end portion of the second arm member.

4. The repair tool of claim 1, wherein the first and second arm members are pivotally connected to the first and second end portions of the brace member by removable pins.

5. The repair tool of claim 4, further comprising:
a second saddle member which is configured to conform to an outer diameter surface of a second pipe having a diameter different from that of the first pipe; and
a second brace member which is connected to the second saddle member and which comprises first and second end portions to which the first and second arm members are pivotally connectable;
wherein the first and second arm members are removable from the first brace member and connectable to the second brace member to thereby configure the repair tool for use with the second pipe.

6. The repair tool of claim 1, wherein each of the first and second arm members comprises two elongated spaced apart side members which are joined by a transverse connecting member to thereby define a channel, the connecting member including a top panel which extends downwardly and in a direction away from the pipe from a location adjacent the saddle member and a bottom panel which extends downwardly and in a direction toward the pipe from the top panel.

7. The repair tool of claim 1, further comprising a skirt member which is connected to the saddle member and is configured to conform to the outer diameter surface of the pipe and to extend longitudinally over a portion of the pipe located adjacent the saddle member.

8. The repair tool of claim 7, wherein the skirt member is removably connected to the saddle member.

9. A repair tool for use in repairing a break in a water main pipe, the repair tool comprising:
a rigid saddle member which includes a downwardly facing pipe-engaging surface that is configured to conform to an outer diameter surface of the pipe;
a sealing member which is attached to the pipe-engaging surface and is configured to seal between the saddle member and the pipe;
a brace member which is connected to a side of the saddle member opposite the pipe-engaging surface and which includes first and second end portions;
first and second arm members, each of which is pivotally connected to a corresponding end portion and each of which comprises an upper end portion that extends upwardly from the brace member and a lower end portion that extends downwardly from the brace member and inwardly toward the other arm member; and
clamping means connected between the upper end portions for moving the lower end portions toward and away from each other;
wherein in use of the repair tool the saddle member is positioned over the break and the clamping means is operated to move the lower end portions towards each other and into engagement with a portion of the pipe located opposite the saddle member in order to secure the saddle member to the pipe and thereby seal the break.

10. The repair tool of claim 9, further comprising a pair of rollers, each of which is connected to a lower end of the lower end portion of a corresponding arm member and is configured to engage the portion of the pipe located opposite the saddle member when the clamping means is operated to secure the saddle member to the pipe.

11. The repair tool of claim 9, wherein the clamping means comprises a manually-operated telescopic screw jack assembly.

12. The repair tool of claim 11, wherein the screw jack assembly includes a travelling nut which is pivotally connected to the upper end portion of the first arm member and a spindle which is operatively engaged by the travelling nut and includes a first end to which a handle is connected and a second end which is rotatably and pivotally connected to the upper end portion of the second arm member.

13. The repair tool of claim 9, wherein the saddle member comprises a hole which extends through the pipe-engaging surface to an opening defined by the sealing member and the repair tool further comprises:
a manually operated valve which is fluidly connected to the hole; and
a hose which is connectable to the valve;
wherein water emanating from the break is directed by the opening through the hole and into the valve and is selectively ejected through the hose by opening and closing the valve.

14. The repair tool of claim 13, further comprising a nipple which is connected to the saddle member over the hole and extends upwardly through the brace member; wherein the valve is connected to the nipple.

15. The repair tool of claim 9, wherein the first and second arm members are pivotally connected to the first and second end portions of the brace member by removable pins.

16. The repair tool of claim 15, further comprising:
a second saddle member which is configured to conform to an outer diameter surface of a second pipe having a diameter different from that of the first pipe; and
a second brace member which is connected to the second saddle member and which comprises first and second end portions to which the first and second arm members are pivotally connectable;
wherein the first and second arm members are removable from the first brace member and connectable to the second brace member to thereby configure the repair tool for use with the second pipe.

17. The repair tool of claim 9, wherein each of the first and second arm members comprises two elongated spaced apart side members which are joined by a transverse connecting member to thereby define a channel, the connecting member including a top panel which extends downwardly and in a direction away from the pipe from a location adjacent the saddle member and a bottom panel which extends downwardly and in a direction toward the pipe from the top panel.

18. The repair tool of claim 9, further comprising a skirt member which is connected to the saddle member and is configured to conform to the outer diameter surface of the pipe and to extend longitudinally over a portion of the pipe located adjacent the saddle member.

19. The repair tool of claim 18, wherein the skirt member is removably connected to the saddle member.

\* \* \* \* \*